(12) United States Patent
Neyens et al.

(10) Patent No.: US 10,024,731 B2
(45) Date of Patent: Jul. 17, 2018

(54) IMMERSION DEVICE FOR AN OPTICAL FIBER FOR MEASURING THE TEMPERATURE OF A MELT

(71) Applicant: Heraeus Electro-Nite International N.V., Houthalen (BE)

(72) Inventors: Guido Jacobus Neyens, Opoeteren (BE); Michel Thys, Koersel (BE); Frank Stevens, Hasselt (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 238 days.

(21) Appl. No.: 14/983,880

(22) Filed: Dec. 30, 2015

(65) Prior Publication Data

US 2016/0216161 A1 Jul. 28, 2016

(30) Foreign Application Priority Data

Jan. 28, 2015 (EP) .................................. 15152838

(51) Int. Cl.
| | | |
|---|---|---|
| G01K 1/00 | (2006.01) | |
| G01K 7/00 | (2006.01) | |
| G01J 5/00 | (2006.01) | |
| G01K 11/32 | (2006.01) | |
| G01J 5/08 | (2006.01) | |
| G01J 5/04 | (2006.01) | |
| G01J 5/02 | (2006.01) | |

(52) U.S. Cl.
CPC .............. *G01K 11/32* (2013.01); *G01J 5/004* (2013.01); *G01J 5/0275* (2013.01); *G01J 5/042* (2013.01); *G01J 5/047* (2013.01); *G01J 5/048* (2013.01); *G01J 5/0821* (2013.01)

(58) Field of Classification Search
USPC .................. 374/140, 131, 141, 139, 208
See application file for complete search history.

(56) References Cited

U.S. PATENT DOCUMENTS

| 5,585,914 A | 12/1996 | Yamasaki et al. |
|---|---|---|
| 5,733,043 A | 3/1998 | Yamada et al. |
| 2005/0175065 A1 | 8/2005 | Coleman |

(Continued)

FOREIGN PATENT DOCUMENTS

| EP | 0806640 A2 | 11/1997 |
|---|---|---|
| EP | 2799824 A1 | 11/2014 |

(Continued)

OTHER PUBLICATIONS

Patent Examination Report dated Jun. 7, 2016 in AU 2015261656.
Extended Search Report dated Jul. 20, 2015 in EP Application No. 15152838.7.
Office Action dated Dec. 28, 2016 in CA Application No. 2912033.
Office Action dated Nov. 14, 2015 in UA Application No. a 2016 00621.

*Primary Examiner* — Mirellys Jagan
(74) *Attorney, Agent, or Firm* — Panitch Schwarze Belisario & Nadel LLP

(57) ABSTRACT

An immersion device for measuring the temperature of a melt with an optical fiber, preferably a metal coated optical fiber, in a metallurgical vessel includes a feeding channel, feeding means for feeding an optical fiber into a disposable guiding tube and for feeding the disposable guiding tube together with the optical fiber into the melt, and control means for monitoring the position of an end of the optical fiber relative to an end of the disposable guiding tube. The relative position determines the quality of a temperature measurement.

17 Claims, 7 Drawing Sheets

(56) References Cited

U.S. PATENT DOCUMENTS

| | | | | |
|---|---|---|---|---|
| 2006/0114967 A1* | 6/2006 | Dams | ................... | G01J 5/0044 |
| | | | | 374/139 |
| 2006/0115205 A1* | 6/2006 | Cuypers | ............... | G01J 5/0003 |
| | | | | 385/12 |
| 2009/0262780 A1* | 10/2009 | Uebber | ................... | B22D 2/00 |
| | | | | 374/139 |
| 2010/0020845 A1* | 1/2010 | Dams | ....................... | G01J 5/02 |
| | | | | 374/139 |
| 2014/0321504 A1 | 10/2014 | Neyens et al. | | |
| 2015/0323258 A1* | 11/2015 | Neyens | ............... | F27D 21/0014 |
| | | | | 374/140 |
| 2016/0216160 A1* | 7/2016 | Neyens | ................. | G01K 1/146 |
| 2016/0216161 A1* | 7/2016 | Neyens | ................. | G01K 11/32 |
| 2016/0216162 A1* | 7/2016 | Neyens | ................. | G01K 11/32 |

FOREIGN PATENT DOCUMENTS

| | | |
|---|---|---|
| JP | H 0658816 A | 3/1994 |
| JP | H07151608 A | 6/1995 |
| JP | H09304185 A | 11/1997 |
| JP | 2003-181601 A | 7/2003 |
| JP | 2010-071666 A | 4/2010 |
| UA | 82637 C2 | 4/2008 |
| UA | 112664 C2 | 10/2016 |

\* cited by examiner

IMMERSION DEVICE FOR AN OPTICAL FIBER FOR MEASURING THE TEMPERATURE OF A MELT

BACKGROUND OF THE INVENTION

The present invention relates to an immersion device for measuring the temperature of a melt with an optical fiber, preferably a metal coated optical fiber, in a metallurgical vessel.

An immersion device for measuring the temperature of a melt with an optical fiber in a metallurgical vessel is known from EP 2 799 824 A1. Specifically, EP 2 799 824 A1 discloses a robotic immersion device for measuring the temperature in a metallurgical vessel using a molten metal-immersed consumable optical fiber and immersion equipment capable of inserting a temperature device through a side wall of an EAF to a predictable molten steel immersion depth with a temperature-to-temperature measuring frequency of less than 20 seconds. The robotic immersion comprises a disposable guiding tube having an immersion end and a second end, opposite to the immersion end. An optical fiber can be partially arranged in the disposable guiding tube, whereby the inner diameter of the disposable guiding tube is larger than the outer diameter of the optical fiber which is, as a rule, metal coated. An elastic plug is arranged at the second end of or within the disposable guiding tube, whereby the optical fiber is fed through the elastic plug and whereby the elastic plug reduces a gap between the optical fiber and the disposable guiding tube. In a first phase, the optical fiber and the immersion end of the disposable guiding tube are immersed into the melt. In a subsequent second phase, the optical fiber is immersed with higher speed and deeper into the melt than the disposable guiding tube for measuring the temperature of the melt. In a subsequent third phase, the optical fiber is withdrawn from the melt and the disposable guiding tube is ejected into the melt. For a further temperature measurement, it is necessary to provide a further disposable guiding tube.

The robotic immersion device known from EP 2 799 824 A1 comprises encoders and inductive position devices for monitoring the position of the end of the fiber. Further, the robotic immersion device comprises two independent feeding motors combined with separate feeding controls, one for feeding the optical fiber and one for feeding the disposable guiding tube.

JP H09304185 (A) discloses a metallic sheath optic fiber for measuring the temperature of molten steel, wherein a sent length of the optic fiber is measured by a motor with encoder. A corresponding device is also known from JP H07151608 (A).

It is an objective of the present invention to improve the temperature measurement with an optical fiber in a metallurgical vessel.

BRIEF SUMMARY OF THE INVENTION

An immersion device according to the present invention comprises a feeding channel and feeding means for feeding an optical fiber into a disposable guiding tube and for feeding the disposable guiding tube together with the optical fiber into a melt. The immersion device comprises control means for monitoring the position of an end of the fiber relative to an end of the guiding tube. As a rule, the control means comprise detectors and encoders to determine the position of the fiber and the guiding tube and a computer to calculate the position of the fiber relative to the guiding tube.

It was found that the relative position determines the quality of a temperature measurement. Consequently, monitoring the relative position makes it possible to determine the quality of a temperature measurement, and thus to improve the measurement of a temperature of a melt.

In a preferred embodiment of the present invention, the control means accepts a temperature measurement depending upon the position of an end of the fiber relative to an end of the guiding tube, and thus in dependence on the quality of the temperature measurement. If the relative position was not appropriate during the measurement of a temperature, the control means will not accept the result. Consequently, this embodiment contributes to an improved determination of temperature of a melt.

In a preferred embodiment of the present invention, the control means comprise detectors for detecting the position of the fiber as well as the position of the guiding tube. This embodiment allows the determination of the position of the guiding tube as well as the position of the fiber in a very reliable manner.

An appropriate arrangement for the one or more detectors for monitoring the position of the guiding tube is adjacent to the feeding channel. Preferably, the one or more detectors are placed below the ground level of the feeding channel. This makes it easy to refill a feeding channel with a new guiding tube subsequent to a temperature measurement. More preferably, the one or more detectors are placed along the feeding channel, especially at regular intervals. This improves monitoring of the position of the guiding tube in the course of a measurement cycle. In a preferred embodiment, there are at least three, preferably at least four, detectors which are placed along the feeding channel for monitoring the guiding tube. In an embodiment, the distance between the detectors is less than 50 cm, preferably less than 20 cm.

In a preferred embodiment of the present invention, at least one detector for monitoring the position of the fiber is placed adjacent to the inlet of the feeding channel in order to determine the relative position in a precise manner.

Since it is difficult to determine the position of an end of the fiber within the guiding tube, it is preferred to know the exact position of an end of the fiber before the fiber moves into the guiding tube. For this reason, there are preferably two detectors for monitoring the position of the fiber which are placed along the feeding direction adjacent to the entrance of the feeding channel, in order to determine the exact position of the end of the fiber as long as possible and as precisely as possible before the fiber end enters the guiding tube.

For corresponding reasons, the control means are configured such that the control means can stop the movement of the fiber as soon as an end of the fiber arrives at a position between the two detectors, because this is the most appropriate starting position for a fiber in order to determine the relative position in a precise manner.

Subsequent to a temperature measurement, the fiber will be removed from the melt and will be, for example, recoiled. In a preferred embodiment, the control means stop the recovery of the fiber as soon as the corresponding end of the fiber arrives at the position between the two detectors. This allows a next temperature measurement in a very quick manner.

The distance between the two detectors for the fiber is less than 25 cm, preferably less than 15 cm, more preferably less than 10 cm.

Preferably, the control means comprises a sensor for measuring the fiber feeding length for the fiber and/or a sensor for measuring the fiber feeding length for the guiding tube. The sensor for measuring the fiber feeding length for the fiber particularly allows the determination of the relative position without great technical effort.

Proximity sensors, preferable inductive proximity sensors, are appropriate for monitoring the position of the guiding tube and/or the fiber.

Preferably, the feeding means for the guiding tube comprises one or more motor driven wheels at the outlet of the feeding channel. This embodiment allows a control of the movement of the guiding tube together with fiber as long as possible for improving a temperature measurement. Preferably, one or more spring-loaded wheels push the guiding tube against the one or more motor driven wheels, which further improves controlling the movement of the guiding tube together with fiber and thus the temperature measurement. The one or more motor driven wheels are preferably cogwheels in order to improve the grip between the motor driven wheels and the guiding tube.

A first spring-loaded wheel is in the feeding direction and is preferably less spring-loaded than a second subsequent spring-loaded wheel, so that the second wheel puts more pressure on the guiding tube than the first spring-loaded wheel in order to feed the guiding tube in a trouble-free manner.

In a preferred embodiment, a motor driven wheel, preferably a motor driven cogwheel, together with one or more movable wheels or disks for pushing a guiding tube against the motor driven wheel is placed before the spring-loaded wheels in order to improve the feeding mechanism and thus the temperature measurement.

A feeding mechanism for feeding the fiber into a guiding tube is preferably arranged adjacent to the inlet of the feeding channel.

Preferably, the immersion device comprises at least two independent feeding motors combined with separate feeding controls, one for feeding the optical fiber and one for feeding the disposable guiding tube.

In a preferred embodiment, two bars, preferably metallic bars form the feeding channel acting as guiding rails for the guiding tube.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
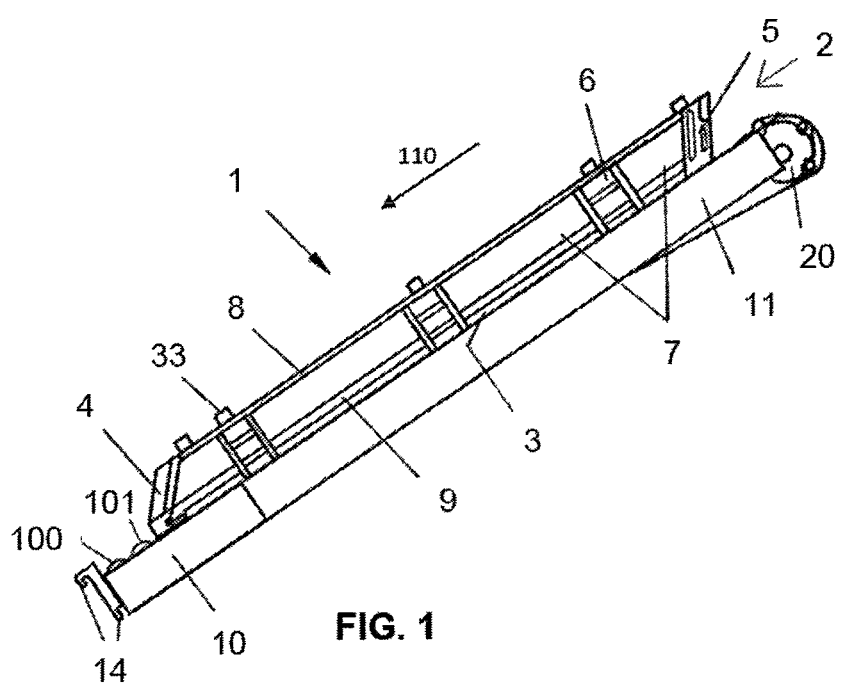
FIG. 1 is a side view of the immersion device according to an embodiment of the present invention.

FIG. 1 shows an immersion device 1 for disposable guiding tubes of a robotic immersion device. The immersion device comprises a stack 2 for the disposable guiding tubes, as known from EP 2 799 824 A1, formed from metal. Two movable metal bars 3 define a feeding channel area for feeding an optical fiber into a disposable guiding tube and for feeding the disposable guiding tube together with optical fiber into a melt. In the feeding direction, the bars 3 extend in a downhill direction in order facilitate the feeding of a guiding tube into a melt when the immersion device 1 is connected to an access panel of a furnace, as known from EP 2 799 824 A1. The stack 2 is arranged above the bars 3 of the feeding channel so that a movable guiding tube can fall from the stack into the feeding channel.

The stack 2 comprises a lower end wall 4 and an upper end wall 5. Both end walls 4, 5 of the stack 2 form an acute angle with the bars 3 of the feeding channel, so that both end walls 4 and 5 extend in a perpendicular direction in the working position of the immersion device 1. The extension in the perpendicular direction facilitates the transfer of the guiding tubes from the stack 2 into the bars 3 of the feeding channel. Clamping effects within the stack 2 are avoided. The stack 2 comprises lateral boundaries for the guiding tubes, namely three small rectangular plates 6 so that there remains a large distance 7 between the rectangular plates 6, as well as between a rectangular plate 6 and an adjacent end wall 4, 5. Due to the large distances 7 and corresponding openings, small external metal pieces which can remain within the stack and block the access into the feeding channel are avoided. Thus, the lower end wall 4 as well as the rectangular plates 6 can hold a plurality of guiding tubes within the stack 2, but not undesirable small external scrap or other metal pieces which may fall down in the environment of a furnace.

The preferably rectangular plates 6 and the end walls 4 and 5 are connected by an upper rod 8 and a lower rod 9. As a result, all parts of the stack 2 are fixed together so that the stack can be handled independently from the further components of the immersion device 1. It is possible to detach the stack 2 from the further components without tools due to a form fit connection in connection with gravity.

All parts of the stack are formed from metal. As a rule, the further parts and components of the immersion device 1 are also formed from metal.

The immersion device 1 further comprises a metal body which is composed of two housings 10 and 11. The body, and particularly the housings 10 and 11, cover the electrical equipment of the immersion device. The two housings 10 and 11 are connected by a form fit connection so that it is possible to separate the lower housing 10 from the upper housing 11 without tools. The two bars 3 are connected to the body by a form fit and/or a frictional connection so that it is possible to detach the bars from the body 10, 11 without tools. As a rule, the bottom of the body comprises one or more electrical connectors.

As a result, the immersion device 1 can be dismantled into individual parts in a very quick and easy manner. On the other hand, it is possible to assemble the individual parts in a quick and easy manner especially in places where space is limited. For this reason, the immersion device can be installed easily. A lot of space is not necessary for the installation. Thus, the corresponding handling is very convenient.

The (in the working position, lower) housing 10 is much smaller than the (upper) housing 11. For this reason, it is possible to attach the lower housing 10 in a fast and easy manner at an access panel of a furnace. This is of importance since the access panel and the environment of the access panel may be very hot and dangerous. After the installation of the smaller housing 10, it is possible to connect the larger housing 11 to the smaller housing 10 which is not hot and which provides a distance between the access panel and the mounting position for the larger housing 11. For this reason, mounting the larger panel is less dangerous.

Two motor driven cogwheels 100, 101 protrude from the smaller housing 10. The smaller housing 10 covers an electromotor which drives the two cogwheels 100 and 101. Two further wheels, which are not shown, are arranged above the two motor driven cogwheels 100, 101. Both further wheels are spring-loaded and are able to push a guiding tube against the motor driven cogwheels. The first spring-loaded wheel, which can push a guiding tube against the cogwheel 101, is less spring-loaded than the second spring-loaded wheel, which can push a guiding tube against the second motor driven wheel 100. When a guiding tube moves along the feeding channel due to a first drive, the guiding tube will first arrive at the motor driven cogwheel 101. Since the assigned spring-loaded wheel is less spring-loaded, the guiding tube can get between the motor driven cogwheel 101 and the assigned spring-loaded wheel in a reliable manner. When the motor driven cogwheel 101 catches the guiding tube, there is an additional drive for the guiding tube. As a result, the guiding tube can subsequently get between the further motor driven cogwheel 100 and the assigned spring-loaded wheel in a reliable manner.

The motor driven cogwheel 100 is the last drive for the guiding tube adjacent to the outlet of the immersion device. The grip between the last cogwheel 100 and the guiding tube is very strong, so that the movement of the guiding tube can be controlled in a very precise manner.

The arrow 110 indicates the immersion direction.

Figure 2:
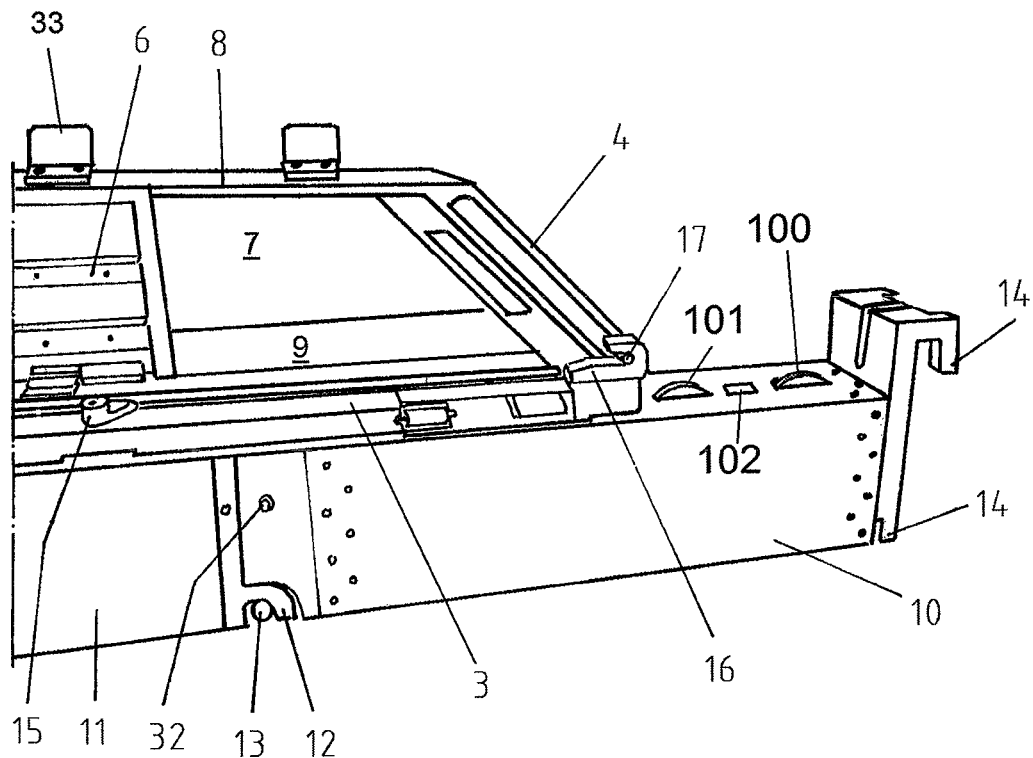
FIG. 2 is a side view of a section of the immersion device according to an embodiment of the present invention.

FIG. 2 shows further details of the immersion device. The form closure connection, particularly the form fit connection, between the two housings 10 and 11 comprises two hooks 12 and two bolts 13. It is possible to attach the hooks 12 of the larger housing 11 to the bolts 13 of the smaller housing 10 as shown in FIG. 2. In addition, a rod 32 may be fed through overlapping walls of the two housings 10 and 11 in order to provide a form fit connection between the two housings 10 and 11.

The other end of the smaller housing 10 comprises at least two hooks 14, preferably four hooks 14, in order to hook the housing 10 into corresponding rods of a furnace access panel and to attach the housing 10 to the access panel in an extremely simple and fast manner.

Separation elements 15 are rotatably connected to the larger housing 11. The housing 11 covers one or more motor drives for the separation elements 15. The axis of a separation element 15 feeds through a bar 3 of the feeding channel.

The smaller housing 10 comprises two U-shaped connection elements 16. Two corresponding bolts 17 of the end wall 4 of the stack are inserted into the U-shaped connection elements 16.

There is an inductive proximity switch 102 between the two cogwheels 100 and 101 that can detect the presence, and thus the position, of a guiding tube. The cogwheel 100 immediately adjacent to the outlet of the immersion device takes care that it is always possible to eject a guiding tube subsequent to a temperature measurement. Immediately adjacent to this last drive 100 for ejecting a guiding tube is a last detector 102 for detecting the position of a guiding tube as long as possible in the course of a measurement cycle.

Figure 3:
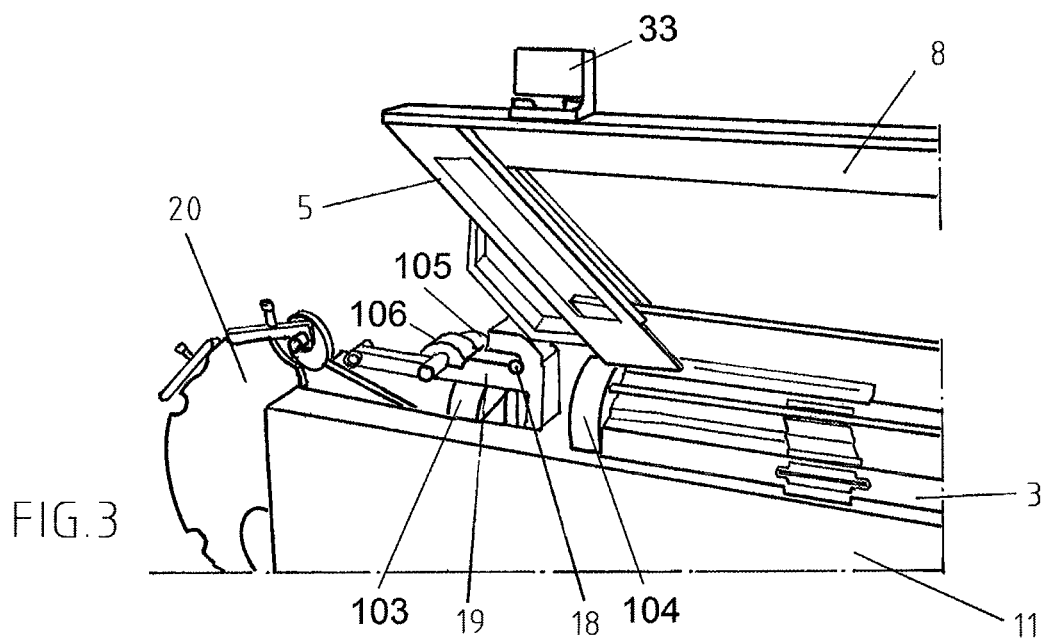
FIG. 3 is a side view of a further section of the immersion device according to an embodiment of the present invention.

FIG. 3 is a side view of a further section of the immersion device 1. The larger housing 11 also comprises two U-shaped connection elements 19 which are hooked into two corresponding bolts 18 of the end wall 5 of the stack. In the working position, the openings of all U-shaped connection elements 16 and 19 are above the bottom of the "U" of the U-shaped connection elements 16 and 19, when the immersion device is connected to a furnace. As a result, the inserted bolts 17 and 18 of the stack remain within the U-shaped connection elements 16 and 19 due to gravity. In the working position, the "U" is inclined.

The larger housing 11 comprises a feeding mechanism 20 for a metal coated optical fiber.

Two inductive proximity sensors 103 and 104 protrude from the housing 11 that can detect the presence of an optical fiber fed by the feeding mechanism 20. If the inductive proximity sensor 103 detects the presence of a fiber and the inductive proximity sensor 104 does not detect the presence of a fiber, a fiber end is between the two sensors 103 and 104. In this way, the immersion device can locate the position of the fiber end. There is only a small distance between the two sensors 103 and 104 of less than 20 cm, preferably less than 10 cm, so that it is possible to determine the position of the fiber end in a precise manner. The fiber end is positioned between the sensors 103 and 104 during standstill between two measurement cycles.

An encoder 105 immediately borders a guiding wheel 106. The guiding wheel 106 forces the fiber down. The encoder 105 detects how much fiber is fed or recoiled from a spool. This data is used to control the fiber feeding and recoiling actions. During a fiber feeding cycle, the encoder is in gear with the spool in the cabinet so that, in case the fiber slips on the wheels, the fiber reel uncoils at a slower rate to avoid fiber jams.

Figure 4:
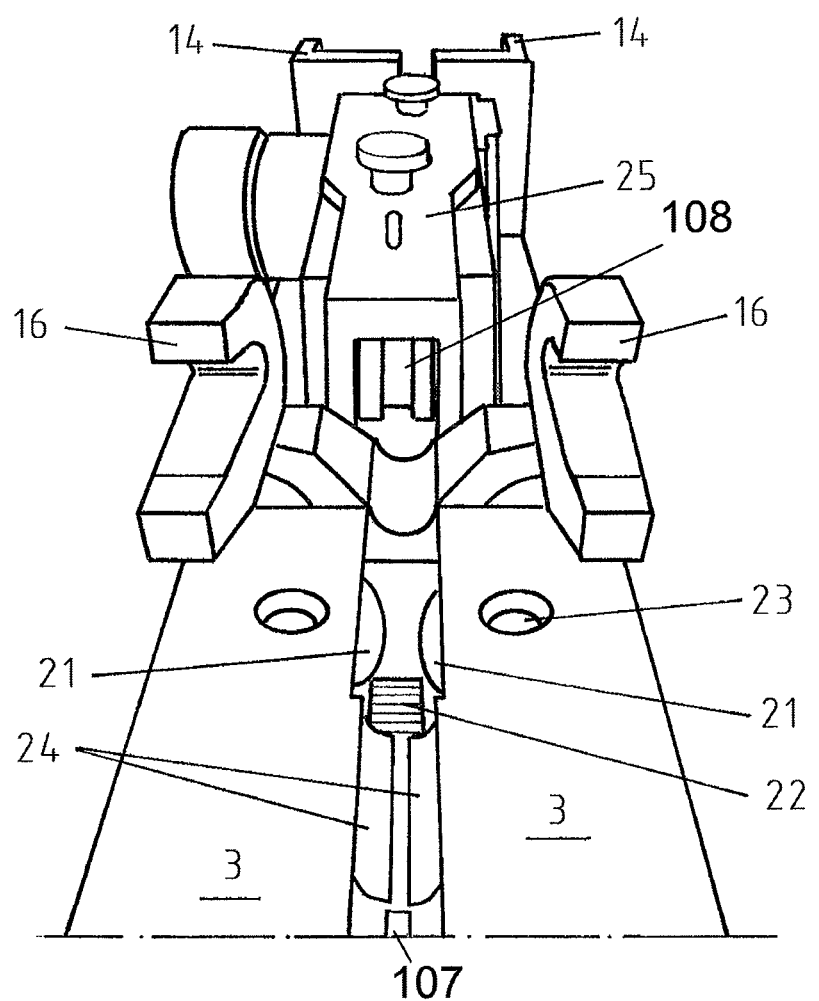
FIG. 4 is a top view of a section of the feeding channel of the immersion device according to an embodiment of the present invention.

FIG. 4 is a top view of a section of the feeding channel area of the immersion device 1. Each bar 3 comprises a disk 21 above a motor driven cogwheel 22. Each disk 21 is rotatably mounted about an axis 23. The rotatable mounted motor driven cogwheel 22 is attached to the body of the immersion device. Two rounded borders 24 of the bars can hold a guiding tube during the transfer from the stack to the feeding channel in an intermediate position. The rounded borders 24 are adapted to the diameter of a guiding tube. The cross section of the rounded borders 24 looks like a quadrant.

At a starting position, the distance between the two moveable disks 21 is such that a guiding tube can fall through the gap between the disks 21 so that a guiding tube can arrive at the ground level of the feeding channel. When a guiding tube enters the feeding channel, a subsequent displacement of the disks 21 and the bars 3 reduces the distance between the disks 21 in such the manner that the guiding tube will be pressed or pushed against the motor driven cogwheel 21, since at least the borders of the two disks 21 are wedge-shaped and/or rounded in an appropriate manner.

Adjacent to the end of the bars 3, a further cover 25 can be mounted, preferably without the need for tools, on the body of the immersion device in order to protect the guiding tubes against the environment, for example falling or settling debris. The housing 25 covers the spring-loaded guiding wheels 108, as well as an encoder for the guiding tube.

Inductive proximity switches 107 are placed adjacent to the ground of the feeding channel as well as along the feeding channel. Each distance between these proximity switches 107 is preferably less than 40 cm, more preferably less than 30 cm.

Figure 5:
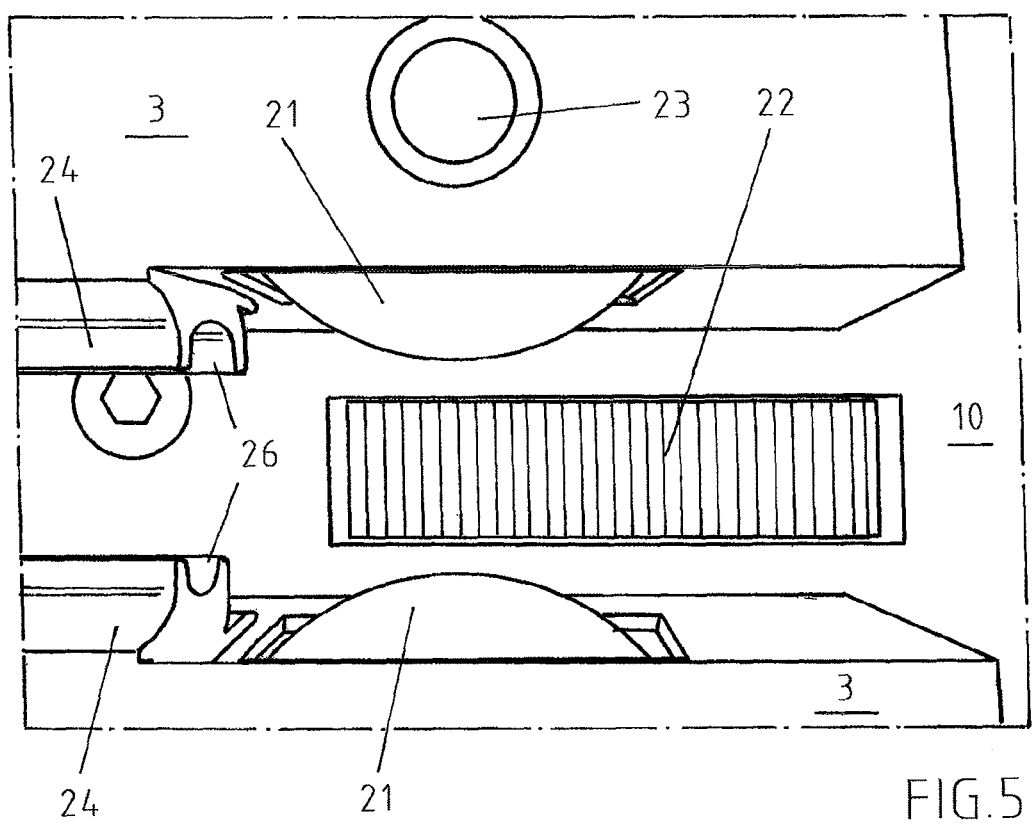
FIG. 5 is a top view of the cogwheel of the feeding channel of the immersion device according to an embodiment of the present invention.

FIG. 5 is a top view of the motor driven cogwheel 22 of the feeding channel. The two bars 3 are in the starting position so that a guiding tube can fall on the cogwheel 22 and can thus arrive at the ground level of the feeding channel formed from two semicircle cuts 26 of the two bars 3. The semicircle cuts 26 are situated below the quadrant cuts 24 of the bars 3. The two quadrants 24 form a first compartment for a guiding tube and the two semicircles 26 form a second compartment for a guiding tube, namely the feeding channel.

The transfer of a guiding tube from the stack 2 into the feeding channel 26 takes place as follows. At the beginning, the two bars 3 are in a feeding position. In this feeding position, the distance between the two bars 3 is minimized so that there is no gap or nearly no gap between the two bars 3. When the two bars 3 are in the feeding position, the separations elements 15 rotates from its separation position in its unclosed position so that a guiding tube of the stack can fall through a gap between each pair of separation elements 15, and can thus enter the first compartment formed from the two quadrant like clearances 24. The distance between the ground of this first compartment and the separation elements 15 corresponds with the diameter of one guiding tube. For this reason, only one guiding tube can fall through the separation elements 15. When a first guiding tube is in the first compartment, the separation elements 15 rotates back into its separation position so that there is a barrier for the further guiding tubes of the stack. Afterwards, the bars 3 move from the feeding position into the opened position until there is a gap between the two bars 3 which allows the first guiding tube to fall from the first compartment to the ground level of the feeding channel formed by the semicircular cuts 26. Afterwards, the bars move back into the feeding position and, consequently, the two disks 21 push the guiding tube against the cogwheel 22. The first guiding tube is now ready for carrying out a temperature measurement.

Figure 6:
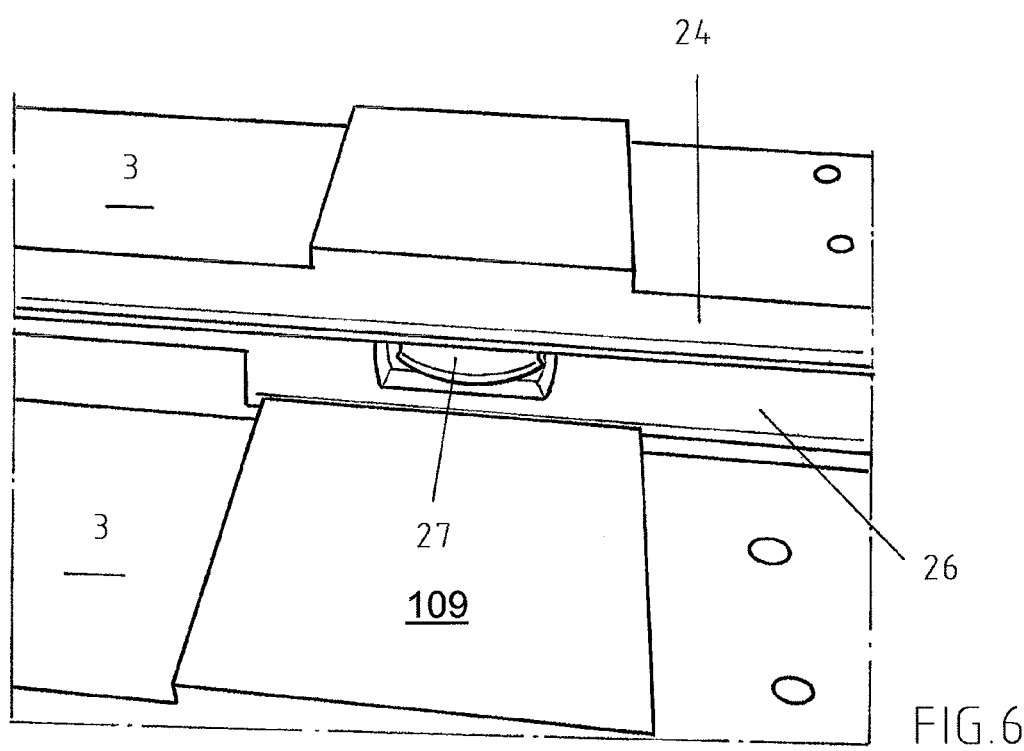
FIG. 6 is a side view of a guiding wheel of the feeding channel of the immersion device according to an embodiment of the present invention.

FIG. 6 shows that each semicircle cut 26 comprises a plurality of wheels 27 which can rotate freely. The rotatable wheels 27 act as guidance for a guiding tube within the feeding channel in order to minimize undesired friction effects. The border of the wheels 27 is rounded in such a manner that the border is adapted to the rounded shape of a guiding tube. In addition, there are bases 109 below, as well as adjacent to, the semicircle cuts 26 providing the ground level for the guiding tubes.

Figure 7:
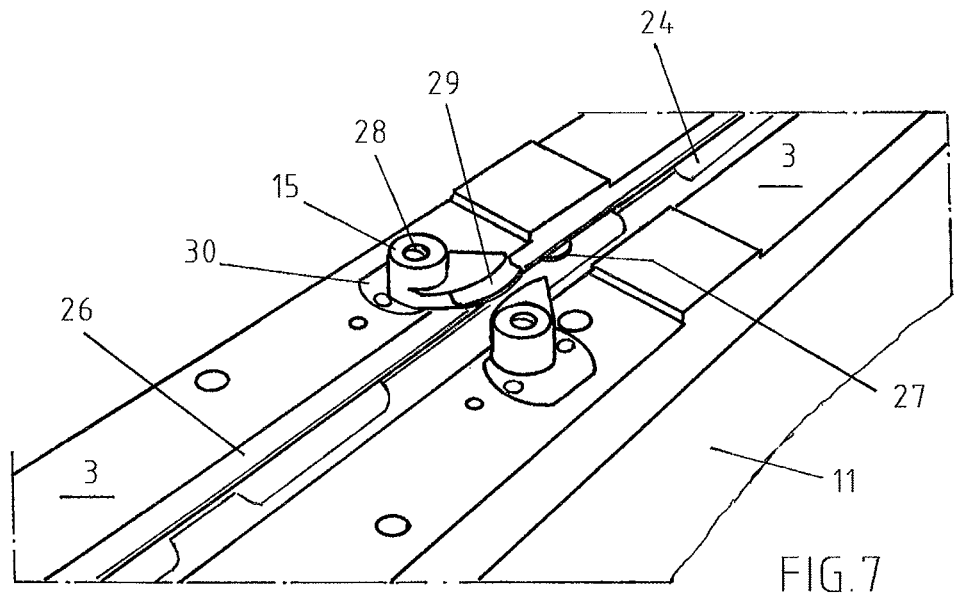
FIG. 7 is a view of separation elements of the transfer mechanism of the immersion device according to an embodiment of the present invention.
Figure 8:
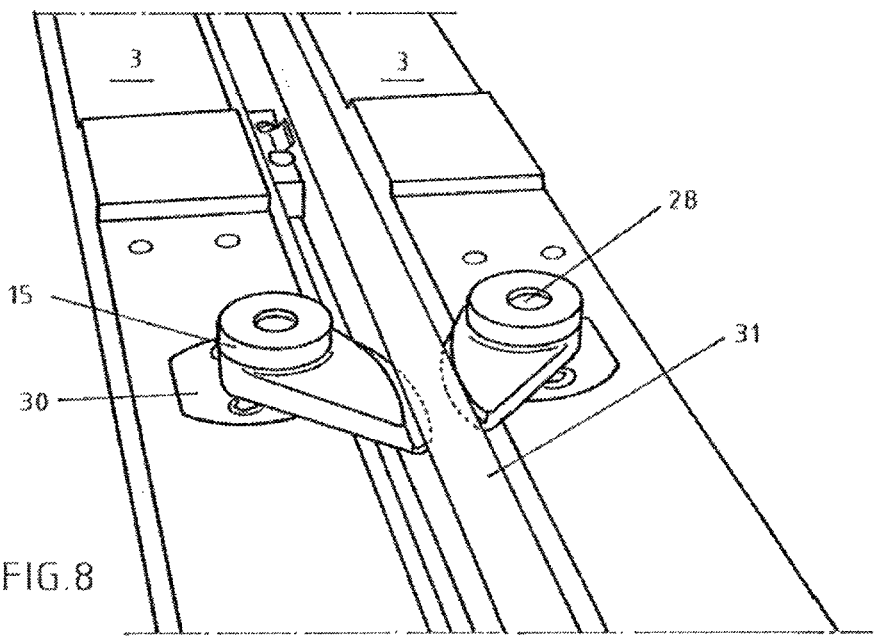
FIG. 8 is a view of separation elements holding a guiding tube of the immersion device according to an embodiment of the present invention.

FIGS. 7 and 8 are views of rotatable separation elements 15 attached to the axis 28. Each separation element 15 comprises a wing having a wedge-shaped or rounded edge 29 which can form a barrier for guiding tubes 31, as shown in FIG. 8. Each axis 28 is attached to the body of the immersion device and is fed through one of the bars 3. Each bar 3 is fixed by protrusions 30 attached at the body of the immersion device. Each protrusion 30 reaches into a corresponding opening of a bar 3 so that there is a frictional connection. As long as the separation elements 15 are attached at the body, it is not possible to remove the bars 3 from the body, namely from the protrusions 30 of the body. The wings of the separation elements can rotate between a separation position, shown in FIGS. 7 and 8, and a non-closed position which allows a guiding tube 31 to fall down toward the feeding channel area.

The stack 2 and the feeding channel area formed by the bars 3 are situated in the middle of the body of the immersion device in order to obtain an equilibrium state.

Figure 9:
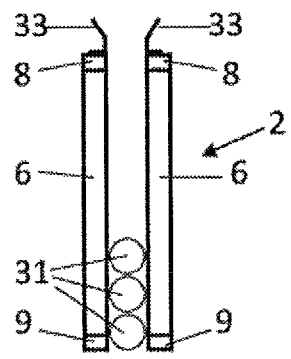
FIG. 9 is a cross-sectional view of the stack of the immersion device according to an embodiment of the present invention.

As shown in FIG. 9, the stack preferably comprises guiding elements 33 on the upper rod 8 forming a V-shaped access into the stack 2. The guiding elements 33 facilitate filling the stack 2 with the guiding tubes 31. For stability reasons, at least some of the guiding elements 33 are preferably placed above the rectangular plates 6 as shown in FIGS. 1, 2 and 9.

As a rule, all parts of the housing, the wheels and so on are made from metal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An immersion device (1) for measuring the temperature of a melt with an optical fiber in a metallurgical vessel, the immersion device comprising:
    a feeding channel (26);
    feeding means (20, 21, 22, 27, 106, 108) in communication with the feeding channel (26) for feeding an optical fiber into a disposable guiding tube (31) and for feeding the disposable guiding tube (31) together with the optical fiber into the melt; and
    control means (102, 103, 104, 105, 107) for monitoring the position of an end of the optical fiber relative to an end of the disposable guiding tube (31).

2. The immersion device according to claim 1, wherein the control means (102, 103, 104, 105, 107) are configured to accept a temperature measurement dependent upon the position of the end of the optical fiber relative to the end of the disposable guiding tube (31).

3. The immersion device according to claim 1, wherein the control means comprises a sensor for measuring a fiber feeding length (105) for the optical fiber and/or a sensor for measuring a feeding length for the disposable guiding tube (31).

4. The immersion device according to claim 1, wherein the control means comprise proximity sensors for monitoring a position of the disposable guiding tube (31) and/or the optical fiber.

5. The immersion device according to claim 1, wherein the control means (102, 103, 104, 105, 107) comprise one or more detectors (102, 103, 104, 107) for detecting a position of the optical fiber and a position of the disposable guiding tube (31).

6. The immersion device according to claim 5, wherein the one or more detectors (102, 107) for detecting the position of the disposable guiding tube (31) are placed adjacent to the feeding channel (26), below the ground level of the feeding channel (26), and/or along the feeding channel (26).

7. The immersion device according to claim 5, wherein at least one detector (103, 104) of the one or more detectors for detecting the position of the optical fiber is placed adjacent to an inlet of the feeding channel (26).

8. The immersion device according to claim 7, wherein two detectors (103, 104) of the one or more detectors for detecting the position of the optical fiber are placed along a feeding direction adjacent to the inlet of the feeding channel (26).

9. The immersion device according to claim 8, wherein the control means are configured to stop a movement of the optical fiber as soon as the end of the optical fiber arrives at a position in between the two detectors (103, 104) for detecting the position of the optical fiber.

10. The immersion device according to claim 8, wherein the control means are configured to stop removing the optical fiber subsequent to a temperature measurement as soon as the end of the optical fiber arrives at the position in between the two detectors (103, 104) for detecting the position of the optical fiber.

11. The immersion device according to claim 8, wherein a distance between the two detectors (103, 104) for detecting the position of the optical fiber is less than 20 cm.

12. The immersion device according to claim 1, wherein the feeding means for feeding the disposable guiding tube comprises one or more motor driven wheels (100, 101) at an outlet of the feeding channel (26).

13. The immersion device according to claim 12, wherein a detector (102) for monitoring a position of the disposable guiding tube (31) is situated in between the two motor driven wheels (100, 101) at the outlet of the feeding channel.

14. The immersion device according to claim 12, further comprising one or more spring-loaded wheels configured to push the disposable guiding tube (31) against the one or more motor driven wheels (100, 101).

15. The immersion device according to claim 14, wherein in a feeding direction, a first spring-loaded wheel of the one or more spring-loaded wheels is less spring-loaded than a second spring-loaded wheel of the one or more spring-loaded wheels.

16. The immersion device according to claim 15, wherein a motor driven wheel (22) together with one or more movable wheels or disks (21) for pushing the disposable guiding tube against the motor driven wheel are placed adjacent to the spring-loaded wheels.

17. The immersion device according to claim 16 wherein the motor drive wheel is a motor driven cogwheel (22).

\* \* \* \* \*